Patented May 2, 1939

2,157,071

UNITED STATES PATENT OFFICE 2,157,071

ALKYL ETHERS OF META-PHENYLPHENOL

Gerald H. Coleman and Garnett V. Moore, Midland, Mich., assignors to The Dow Chemical Company, Midland, Mich., a corporation of Michigan No Drawing. Application August 27, 1937, Serial No. 161,282

6 Claims. (Cl. 260—612)

This invention concerns certain new alkyl ethers of meta-phenylphenol having the general formula:—

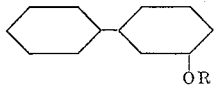

wherein R represents an alkyl radical containing at least 4 carbon atoms.

The new ethers herein disclosed are usually high boiling, colorless liquids, although they are sometimes obtained in solid form. They are useful as plasticizers in cellulose derivative compositions, etc., and as intermediates in the preparation of other organic chemicals.

The new ethers may be prepared by heating a metal meta-phenylphenolate (or a mixture of meta-phenylphenol and an aqueous solution of a metal hydroxide) with an alkylating agent. An alkyl halide, e. g. butyl chloride, secondary butyl bromide, isobutyl chloride, etc., is preferably employed as the alkylating agent although other agents such as dibutyl sulphate, diamyl sulphate, etc., may be used if desired. The alkali employed in the reaction is preferably an alkali metal hydroxide, such as sodium or potassium hydroxide.

The reactants may be employed in any desired proportion, but it is preferable to use approximately 1 mole of alkali and 1 mole of alkylating agent per mole of meta-phenylphenol. The amount of water may be varied between wide limits, but we prefer to employ about 6 parts by weight of water per part of alkali.

The reaction may be carried out by heating the reaction mixture under reflux at atmospheric pressure, or by heating it in a bomb or an autoclave under a pressure corresponding to the vapor pressure of the mixture at the particular temperature employed. In carrying out the reaction under pressure in a bomb or autoclave, the reaction occurs smoothly at temperatures between 90° and 140° C., although higher temperatures may be employed. The time of heating may vary from ½ to 4 hours, depending on the alkylating agent employed, the temperature at which the reaction is carried out, etc. When the reaction is complete, the mixture is cooled, washed with a dilute aqueous alkali solution to remove unreacted meta-phenylphenol, and fractionally distilled to purify the product.

While we prefer to prepare the new ethers in the manner described above, it is sometimes more advantageous, especially in preparing the higher alkyl ethers, to condense an olefine with meta-phenylphenol in the presence of a catalytic amount of sulphuric acid. An example of such procedure is the preparation of the octyl ether of meta-phenylphenol, given below.

The following examples illustrate a number of ways in which the principle of the invention may be employed, but are not to be construed as limiting the invention:—

Example 1

A mixture of 1 gram mol of meta-phenylphenol, 1 gram mol of n-butyl-chloride, 1 gram mol of sodium hydroxide, and 150 grams of water was heated with agitation in a bomb at 125° C. for 2 hours, after which the bomb was cooled and the charge removed. The reacted mixture was washed with a dilute aqueous sodium hydroxide solution and fractionally distilled. There was obtained 3-n-butoxy-diphenyl, a colorless liquid boiling at approximately 145–148° C' at 3 mm. pressure, and having a specific gravity of 1.022 at 20°/4° C. The yield was 92 percent of theoretical, based on the meta-phenylphenol consumed.

Example 2

A mixture of 1 gram mol of meta-phenylphenol, 1 gram mol of secondary-butyl chloride, 1 gram mol of sodium hydroxide and 150 grams of water was heated in a bomb with agitation at 125° C. for 2 hours, after which the produce was separated as in Example 1. There was obtained 3-sec.-butoxy-diphenyl, a colorless liquid boiling at 140–142° C. at 2 mm. pressure, and having a specific gravity of 1.023 at 20°/4° C. The yield was about 69 per cent of theoretical, based on meta-phenylphenol consumed.

Example 3

A mixture of 1 gram mol of meta-phenylphenol, 1 gram mol of tertiary-butyl-chloride, 1 gram mol of sodium hydroxide, and 150 grams of water was placed in a flash fitted with reflux condenser and stirrer. The mixture was heated at reflux temperature for ¾ hour, after which it was cooled, washed with aqueous sodium hydroxide, and fractionally distilled. There was obtained 3-tert.-butoxy-diphenyl in the form of a colorless liquid boiling at approximately 146°–147° C. at 3 mm. pressure, which solidified upon cooling to room temperature. The product was further purified by recrystallization from petroleum ether, after which it melted at 86.5°–87° C.

Example 4

A mixture of 1 gram mol of meta-phenyl-phenol, 1 gram mol of isoamyl chloride, 1 gram mol of sodium hydroxide, and 150 grams of water was heated with agitation at 125° C. in a bomb for 2 hours, after which the product was separated as in Example 1. There was obtained 3-iso-pentoxy-diphenyl, a colorless liquid boiling at approximately 153°–155° C. at 3 mm. pressure, and having a specific gravity of 1.005 at 20°/4° C. The yield was about 96 per cent of theoretical, based on meta-phenylphenol consumed.

*Example 5*

A mixture of 1 gram mol of meta-phenylphenol, 1 gram mol of sodium hydroxide, 1 gram mol of n-hexyl-chloride, and 150 grams of water was heater with agitation at 125° C. in a bomb for 3 hours, after which the product was separated as in Example 1. There was obtained 3-n-hexoxy-diphenyl, a colorless liquid boiling at approximately 167°–169° C. at 2 mm. pressure, and having a specific gravity of 0.998 at 20°/4° C. The yield was 74 per cent of theoretical, based on meta-phenylphenol consumed.

*Example 6*

A mixture of 2 gram mols of meta-phenylphenol, 2 gram mols of di-isobutylene, and 2 cc. of concentrated sulphuric acid were heated at 100° C. for 1 hour in a flask fitted with reflux condenser and stirrer. The reaction product was washed with dilute aqueous sodium hydroxide solution and fractionally distilled. There was obtained the tertiary octyl ether of meta-phenylphenol, a colorless liquid boiling at 176°–180° C. at 3 mm. pressure, having a specific gravity of 1.029 at 20°/4° C., and an index of refraction, $$n_D^{20} = 1.5560$$

Other ethers of meta-phenylphenol which may be prepared in the manner explained above are 3-n-pentoxy-diphenyl, 3-tert.-pentoxy-diphenyl, 3-tert.-hexoxy-diphenyl, 3-n-heptoxy-diphenyl, etc.

Other modes of applying the principle of our invention may be employed instead of those explained, change being made as regards the materials employed, provided the products stated by any of the following claims or the equivalent of such stated products be obtained.

We therefore particularly point out and distinctly claim as our invention:

1. An ether having the general formula

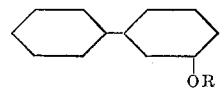

wherein R represents an alkyl radical containing at least 4 carbon atoms.

2. A butyl ether of 3-phenylphenol.

3. An ether having the general formula

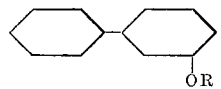

wherein R represents an alkyl group containing at least 4 carbon atoms and at least one tertiary carbon atom.

4. 3-tertiary-butoxy-diphenyl.
5. 3-n-hexoxy-diphenyl.
6. A tertiary octyl ether of meta-phenylphenol.

GERALD H. COLEMAN.
GARNETT V. MOORE.